United States Patent [19]

Glover

[11] 4,133,101
[45] Jan. 9, 1979

[54] METHOD OF FABRICATING A LAMINATED BUS BAR

[75] Inventor: Douglas W. Glover, Harrisburg, Pa.

[73] Assignee: AMP Incorporated, Harrisburg, Pa.

[21] Appl. No.: 540,030

[22] Filed: Jan. 9, 1975

Related U.S. Application Data

[60] Division of Ser. No. 290,013, Sep. 18, 1972, Pat. No. 3,893,233, which is a continuation-in-part of Ser. No. 152,145, Jun. 11, 1971, abandoned.

[51] Int. Cl.² .................. B23P 11/00; B29C 6/02; H01R 43/00
[52] U.S. Cl. .................................. 29/628; 29/525; 264/156; 264/272
[58] Field of Search ............... 264/275, 272, 156, 134, 264/273; 29/628, 525; 174/72 B, 88 B

[56] References Cited

U.S. PATENT DOCUMENTS

| 1,843,622 | 2/1932 | Norton | 264/272 |
| 1,871,492 | 8/1932 | Brennecke | 264/272 |
| 3,236,937 | 2/1966 | Harkness et al. | 264/272 |
| 3,341,939 | 9/1967 | Feinberg et al. | 264/272 |
| 3,436,819 | 4/1969 | Lunine | 264/272 |
| 3,465,402 | 9/1969 | Booe et al. | 264/272 |

Primary Examiner—James B. Lowe
Attorney, Agent, or Firm—AMP Incorporated

[57] ABSTRACT

A bus bar of laminar construction useful for power distribution systems and the like is disclosed with a method of fabricating the bus bar and installing suitably provided contact pins or posts. The method comprises stacking conductive plates and dielectric plates alternatively, encapsulating the conductive and dielectric plates in a solidifiable dielectric medium, drilling apertures through the medium and specified conductive plates, driving the pins and an amount of solidifiable material provided therewith into the apertures and into contact with the conductive plates, and solidifying the solidifiable material to secure the pins in the apertures.

3 Claims, 12 Drawing Figures

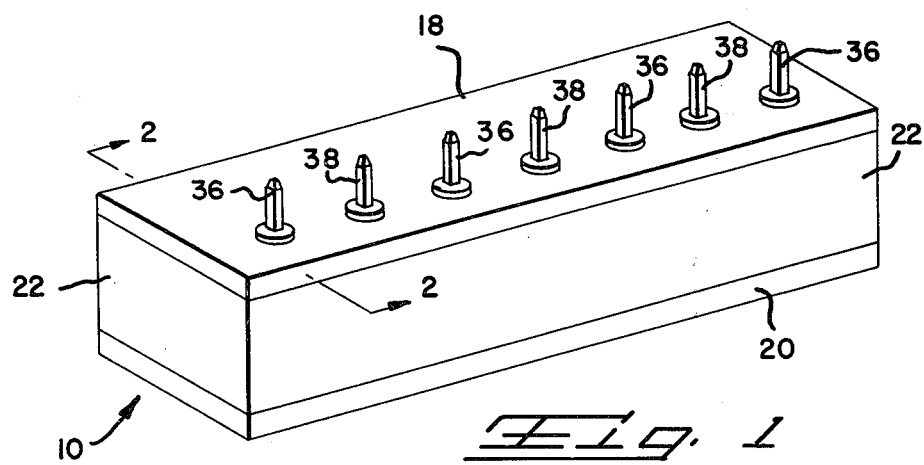
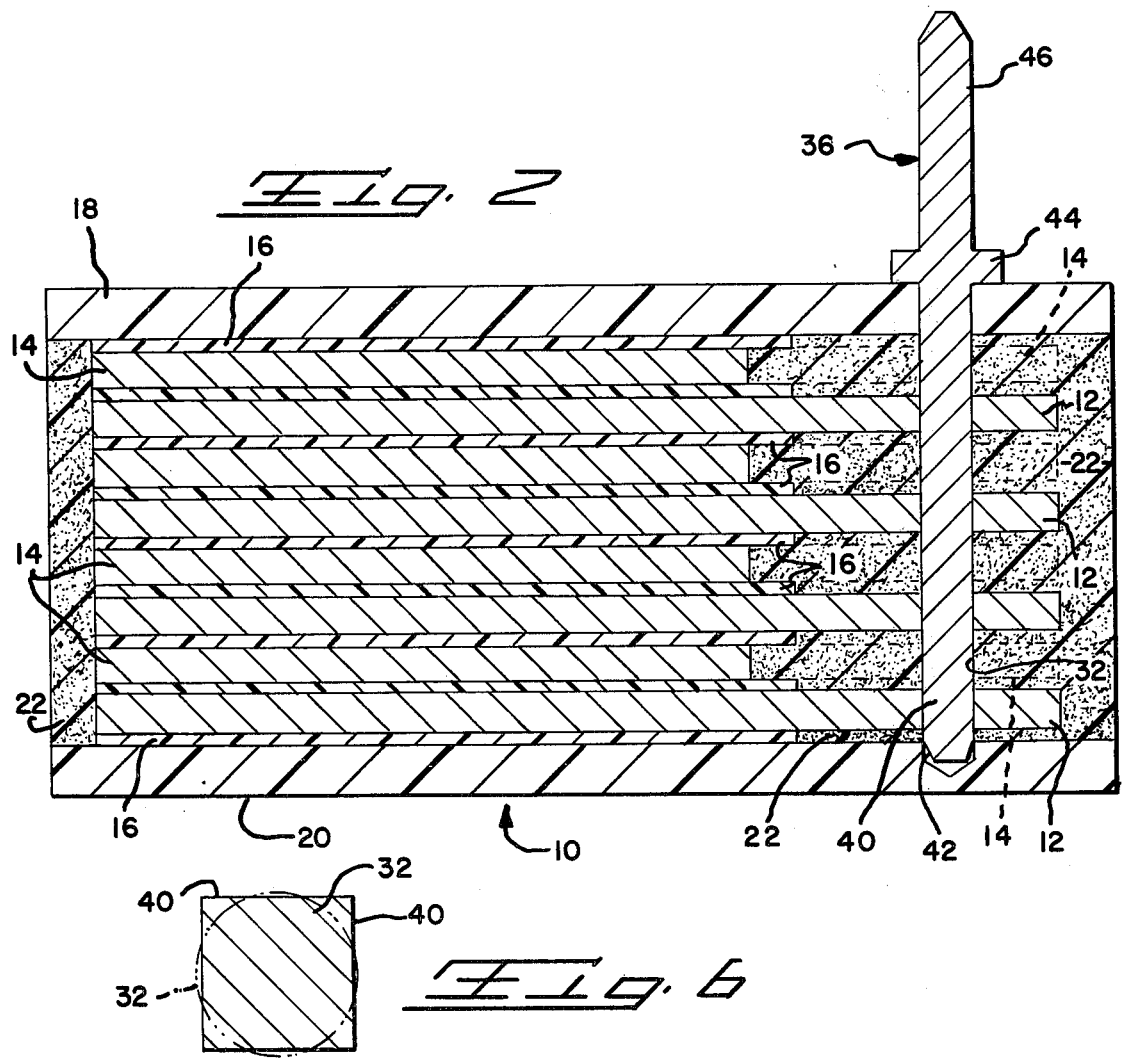

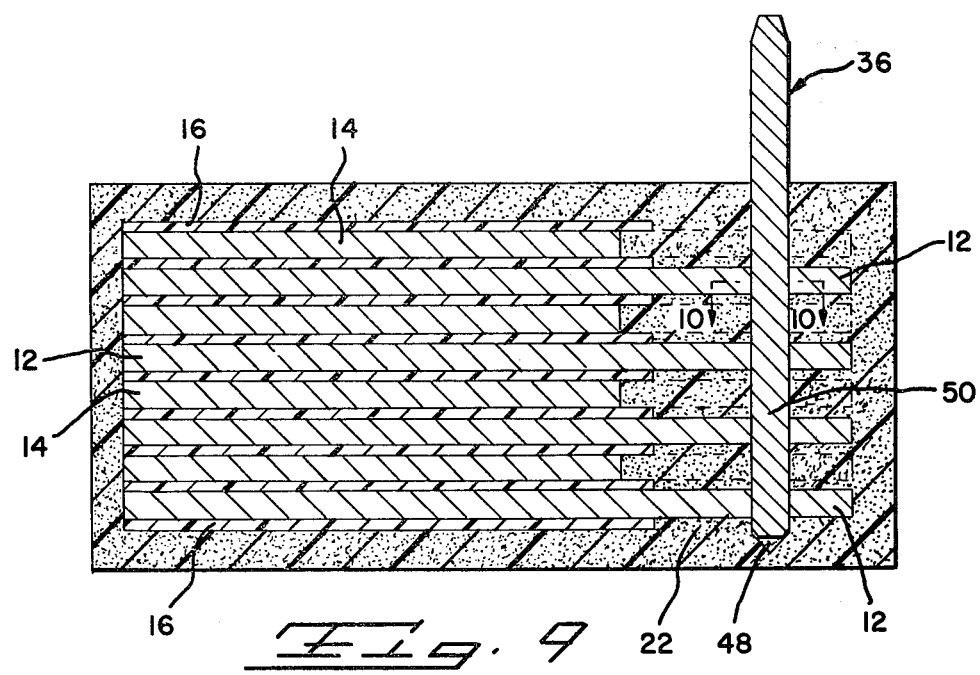
Fig. 9
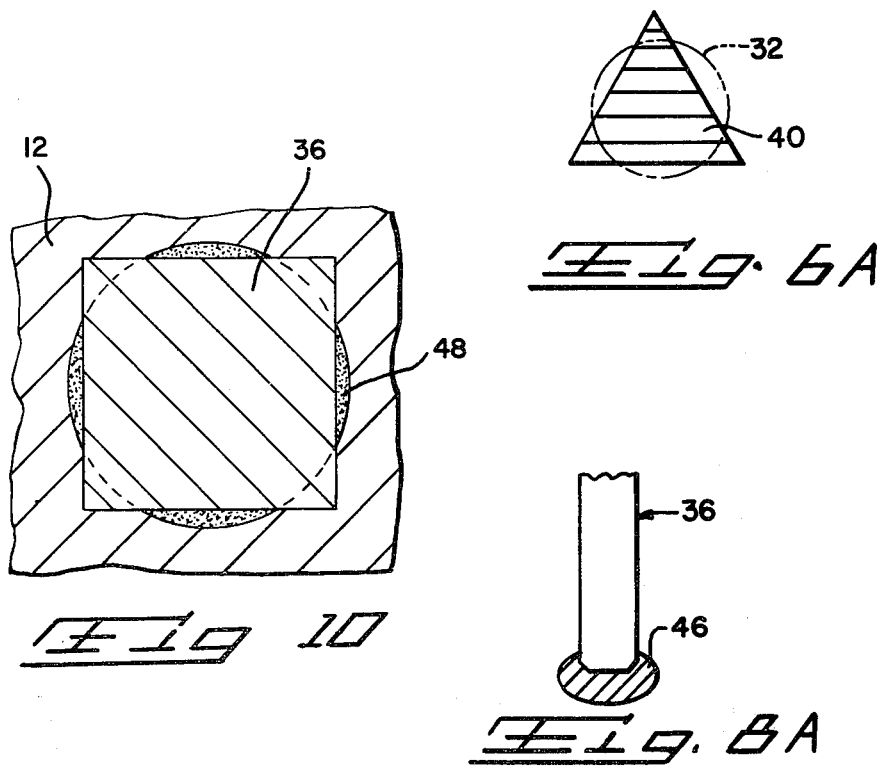
Fig. 6A
Fig. 10
Fig. 8A

METHOD OF FABRICATING A LAMINATED BUS BAR

This application is a division of Ser. No. 290,013 filed Sept. 18, 1972, now U.S. Pat. No. 3,893,233 issued July 8, 1975, which is a continuation-in-part of Ser. No. 152,145 filed June 11, 1971, now abandoned.

The art has faced a difficult problem in providing external connections to laminated bus bars, i.e., to the individual conductor elements thereof. Prior to this invention, the practice has been to employ conductor sheets of relatively complex shape with tabs containing holes or slots being required to receive the contact pins which were mounted in place and soldered to effect the connection. Problems were created in that art work to etch the conductor sheets was complex, with handling and registration or alignment of the plurality of conductor sheets during manufacture of the laminated bus bar becoming critical. Thus the conductor sheets had to be carefully aligned so that the contact pins would fit properly. Finally the insertion and soldering of individual pins was a time consuming step which had to be followed.

It is an object of the present invention to provide an improved bus for power distribution systems which features a novel construction of the contact pins or posts required to make external connections to the conductive members thereof, for purposes of input, output, and ground connections.

Another object is to provide a new and improved method of fabricating laminated bus bars of the type just referred to, and especially to a novel technique for inserting contact posts therein and obtaining a mechanical and electrical connection between such posts and the conductive members of the bus bar.

A further object of the invention is to provide a solderless method of making connection to a laminated bus bar and the connection.

A yet further object of the invention is to provide a method for easily and accurately aligning apertures in a laminated bus bar for reception of a contact pin or post.

A still further object of the invention is to provide a laminated bus bar having substantially circular apertures for reception of a subtantially square post, the diameters of the aperture being substantially the same as or slightly less than the width of the post so that the post corners bit into the regions around the apertures.

It is yet another object of this invention to provide a method for making a laminated bus bar which eliminates voids due to capillary action of an epoxy in a mold.

It is still another object of this invention to provide a method of hermetically sealing a post in a laminated bus bar by allowing an epoxy to travel into the bus bar aperture with the post to fill all voids between post and bus bar.

The bus bar is formed as a laminated structure which includes metallic sheet conductors separated by insulating films affixed to the conductors by an adhesive. Ground plane conductors and power signal conductors are interleaved in the laminated structure, and staggered connection tabs are located along one longitudinal edge. The lamination structure is first formed as a completed unit, and then holes are drilled at predetermined locations along the one edge to intersect the tabs of the conductive sheets. Metallic contact posts, suitably dimensioned according to the teachings herein, are force fitted into the drilled holes along with an epoxy as the final step in forming the bus bar of the invention. In this step the material of the metallic sheet conductors is deformed and cold forged to achieve a good electrical connection, there being a wiping action which takes place between all contacting surfaces.

Other objects and attainments of the present invention will become apparent to those skilled in the art upon a reading of the following detailed description when taken in conjunction with the drawings in which there is shown and described an illustrative embodiment of the invention; it is to be understood, however, that the embodiment is not intended to be exhaustive nor limiting of the invention but is given for purposes of illustration in order that others skilled in the art may fully understand the invention and the principles thereof and the manner of applying it is practical use so that they may modify it in various forms, such as may be best suited to the conditions of a particular use.

IN THE DRAWINGS

FIG. 1 is a perspective view of a power distribution system bus bar in accordance with the present invention;

FIG. 2 is a cross-sectional view showing the details of the laminated bar, with the contact pins or posts installed, the cross-section being taken along line 2—2 in FIG. 1;

FIG. 6 is a diagram to aid in explaining the manner of obtaining an improved mechanical and electrical connection between contact post and conductive sheet in accordance with the invention;

FIG. 6A is similar to FIG. 6 showing in cross-section a post of triangular shape;

FIG. 8A shows the bottom end of the post with a drop of epoxy before being driven into the aperture;

FIG. 9 is a cross-sectional view as in FIG. 8 after the post has been applied to the bus bar; and FIG. 10 is a view taken along the line 10—10 of FIG. 9.

Figures 3, 4, 5:
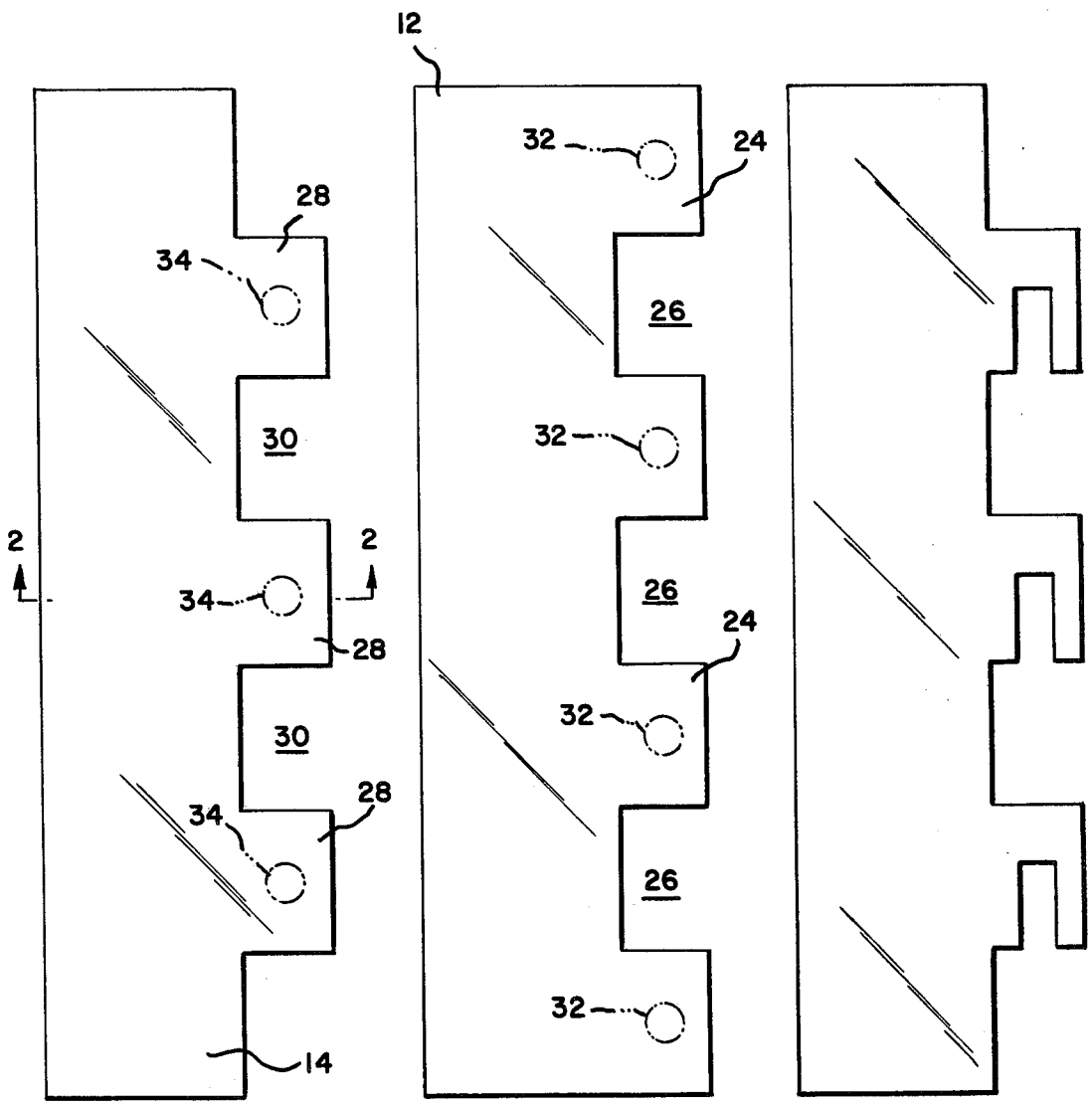
FIG. 3 is a plan view of one of the metallic sheets of the laminated bus bar, this view being of one of the power signal conductors.
FIG. 4 is a similar plan view of one of the ground conductive sheets or elements of the bus bar of the invention.
FIG. 5 is a plan view of a metallic conductive sheet of the kind previously required as conductor elements for prior laminated bus bars, included to aid in visualizing the advantages afforded by the practice of this invention.

As previously indicated, the invention concerns a solderless method and a means for terminating contact pins or posts to the conductive element of a laminated bus bar. The laminated bus bar is a sandwich arrangement of components, as is best disclosed by FIG. 2. The terminating posts are installed subsequent to the fabrication of the bus bar itself, the resulting structure being as illustrated in perspective in FIG. 1. The method and means for termination according to the invention simplifies the fabrication of bus bars, reduces costs, relaxes tolerance requirements, and produces a mechanical and electrical interconnection of post and bus bar conductor of exceptionally high quality.

Referring to FIGS. 1 and 2, the laminated bus bar 10 is disclosed as comprising a plurality of relatively thin metallic sheets 12, of copper or any other suitable electrically conductive material which are interleaved with a like plurality of similar metallic sheets 14. The sheets 12 serve as ground planes as will be seen subsequently, while the other sheets 14 (also of copper or the like) are the power signal conductors. All of the conductive sheets are electrically separated from one another by a plurality of identical thin insulating members 16. These members 16 may be of any suitable electrically insulating material normally used in bus bar construction. In the preferred embodiment shown, they are sheets of Mylar film. In forming the laminations into a sandwich arrangement as shown in the drawing, both faces of each insulating member 16 will have first been coated with a conventional dry, thermoplastic adhesive. Outer covers 18 and 20 of insulation, which may preferably be of phenolic or a glass epoxy, are also provided to serve as the top and bottom covers for the built up laminations.

In laminating the covers 18 and 20 and the component sheets 12, 14 and 16 into a unitary structure, these elements are put together in the positions shown in FIG. 2 and are clamped in place by any suitable means, not shown. They are then subjected to heat and pressure in conventional manner in order to activate the thermoplastic adhesive materials. After cooling of the structure, it is sealed and mechanically completed by encapsulating the laminated sandwich with a suitable low viscosity epoxy filler 22 which is poured in all around the outside edges of the bus bar. The epoxy encapsulant 22 occupies the volume shown in FIG. 2, and is allowed to cure and harden. The epoxy 22 is preferably a semi-rigid epoxy of low viscosity which will confine the copper sheets 12, 14 to their own planes and rigidly seal all the bus bar elements within the cover members 18, 20.

Figure 7:
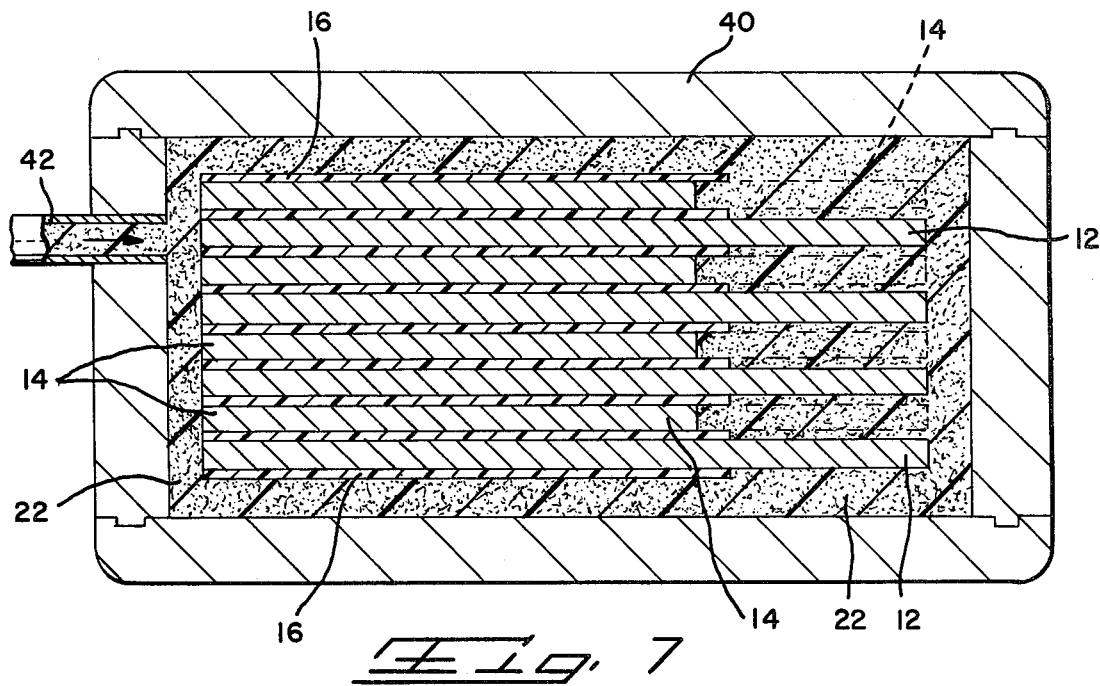
FIG. 7, is a cross-sectional view of a mold in which the bus bar in accordance with the present invention has epoxy added therein.

The bus bar is encapsulated in the epoxy encapsulant by placing the bus bar into a mold 40 as shown in FIG. 7 with the bottom surface of the bus bar spaced from the floor of the mold. The epoxy is then poured into the mold through metered inlet 42 and, due to the epoxy wetting action, the epoxy flows along the bus bar and completely seals all surfaces thereof. A gating device is built into the mold in the form of a thin tube or the like whereby a metered flow rate of epoxy into the mold is provided, thereby allowing the epoxy to flow along the bus bar dur to capillary action. This eliminates voiding since the epoxy wets along the bus bar surfaces and removes the air from the mold.

The ground sheets 12 are each made to have a particular shape or outline along one longitudinal edge such as is shown in FIG. 4. Thus one edge of each sheet 12 has a set of protruding contact tabs or portions 24 separated by areas 26 where the sheet has been cut away. The power signal conductors 14 each have a similarly shaped longitudinal edge comprising protruding contact tabs 28 separated by cutout areas 30. It should be noted that tabs 28 are staggered or interspersed, in the longitudinal direction, with respect to the other tabs 24, for a purpose to be described.

At this stage the bus bar is complete except for providing the necessary external connections for input, output and ground.

In accordance with the novel concepts of the invention, terminations for such inputs, outputs, and ground connections are achieved in the following manner. After the lamination of the bus bar as described above has been completed, a series of holes 32 is drilled in the device at locations along the longitudinal edge of the bar 10 which are substantially at the centers of the tabs 24 of the ground conductor sheets 12. The holes extend through all elements except bottom cover 20, one such hole 32 being shown in FIG. 2 and the locations of the other holes 32 being shown dotted in FIG. 4. Another set of holes 34, interspersed between holes 32 along the aforesaid edge, are similarly drilled at locations which intersect the tabs 28 of the power signal conductors 14. The latter are shown in phantom in FIG. 3. In this manner, there is perfect alignment of the holes drilled through each lamina along the holes 32 or 34.

The desired terminations are effected by inserting a plurality of metallic contact pins or posts 36 into the holes 32 and further identical contact posts 38 into holes 34, these posts being dimensioned, relative to the diameter of holes 32 and 34, to require an interference or force fit. The posts 36 and 38 may be driven into place by any suitable mechanical force producing means. The posts have the shape shown in FIG. 2, and include a lower contact making portion 40 with a lower end tapered as at 42 for ease of entry into the corresponding drilled hole, a shoulder 44 and an external portion 46 which provides a means for external connection. Connections may be made to post portions 46 by the soldering of leads thereon, or by conventional wrap-type connections of clip-type connections. The post is preferably larger in cross-sectional area than the hole, though this is not absolutely necessary. However, one diagonal of the post must be longer than the diameter of the hole.

The posts 36 and 38 are of course of a conductive metallic material of the type normally used in connector devices, such a beryllium copper or phosphor bronze. They are preferably of a square cross-section but also could be rectangular, triangular or polygonal in cross-section. FIG. 6 is a diagrammetic illustration of the necessary relative dimensions of post and hole. The perimeter of the post is indicated at 40 while dotted line 32 represents the circumference of the drilled hole. The hole should have a diameter greater than the overall thickness dimensions of the post, but the post corners should be outside the hole periphery of the hole to provide for the interference fit or force fit required as referred to above.

The post, which is harder than the epoxy 22 is driven into the aperture in the same manner as a nail, the epoxy 22 between the conductors 12 being sufficiently rigid so that movement of the post through the aperture does not deform the conductors 12 downwardly so that adjacent conductors 12 at the right of FIG. 2 or adjacent conductors 12 and 14 at other regions of the bus bar are short circuited to each other. In other words, deformation around the aperture due to insertion of the post is minimal though there is a good wiping action between post and conductor 12 due to the relative dimensions of the post and aperture. The major deformation is away from the hole or in a direction normal to the path of travel of the post due to the relative hadrnesses of the post material and the epoxy 22.

In a typical example of a laminated bus bar actually constructed in accordance with the invention, sheets 12 and 14 were formed of 0.005 thick, ½ H., ETP copper, while the insulator sheets 16 were a Mylar film with a dry thermoplastic adhesive coated on each face prior to lamination. The covers 18 and 20 were of phenolic material, and contact posts or pins 36, 38 were or beryllium copper. The encapsulating compound 22 was a semi-rigid low viscosity epoxy commercially available and indentified as HYSOL Epoxy Patch Kit. No. 0151. The posts were of a square cross-section, 0.025 inch ± 0.00. inch on a side, and holes 32 and 34 had a diameter of 0.026 inch, +0.002 inch and −0.001 inch tolerances. There resulted an excellent mechanical and electrical connection between posts and the bus bar conductors, providing a stable, low resistance electrical connection therebetween.

Bus bars were previously made with conductor sheets or relatively complex shapes such as shown by FIG. 5. The sheets had to be mutually aligned so that the narrow slots shown in the Figure would register with one another, permitting contact pins to be placed therein and then soldered to make the electrical connection. The handling problems were considerable, with tolerances and alignment becoming critical problems also. The art work for forming conductors was more complex, and the contact pins were in the way when the encapsulant was poured in place as a further complication.

With the invention the conductor sheets have simplified shapes, the posts are installed after the laminated structure has been completed making this aspect of the process easier, and soldering, with its difficulties an unreliability, is avoided entirely.

Figure 8:
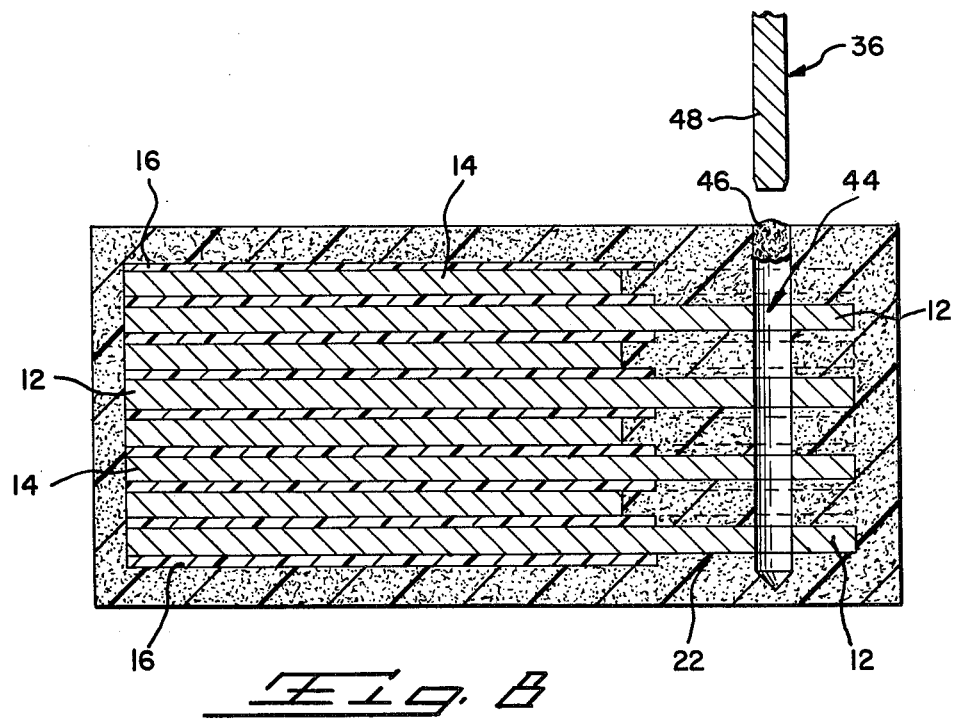
FIG. 8 is a cross-sectional view of a completed bus bar similar to FIG. 1 with a drop of epoxy in the aperture for receiving a post.

Referring now to FIG. 8, there is shown a bus bar as manufactured in the mold of FIG. 7 and similar to the bus bar of FIG. 2. The aperture 33 has been provided for receiving the post 36. A globule of epoxy 46 is positioned at the upper surface of the aperture 44 prior to insertion of the post. Accordingly, upon post insertion, as shown in FIG. 9 and 10, the epoxy travels downwardly and normal to the path of post travel to fill the voids 48 as well as provide an additional securing of the post 36 in the aperture 44. As an alternative, the epoxy can be placed around the lower portion 50 of the post 36 to replace the globule of epoxy 46, An uncured epoxy which cures at room temperature is preferably used.

The providing of the sealing encapsulant 22 is important with regard to the electrical connection which is obtained. It is thought that the encapsulant confines the copper sheets 12, 14 to their own planes during forced insertion of the posts, constraining the copper material against any movement due to the interference force of the post insertion. There is a deformation of the copper sheet to form the electrical connection, accompanied by a wiping action of all surfaces to produce the high quality connection as referred to above.

It will, therefore, be appreciated that the aforementioned and other desirable objects have been achieved; however, it should be emphasized that the particular embodiment of the invention, which is shown and described herein, is intended as merely illustrative and not as restrictive of the invention.

What is claimed is:

1. A method of fabricating a laminated bus bar, comprising the steps of:
   stacking together in alternate layers a plurality of plate conductors of varied surface areas and a plurality of plates of dielectric material,
   said plates of dielectric material having surface areas smaller than adjacent plate conductors of relatively greater surface areas and larger than adjacent plate conductors of relatively smaller surface areas,
   encapsulating said plate conductors and said plates of dielectric material in a solidifiable dielectric medium,
   drilling apertures through said solidifiable medium and at least said plate conductors of relatively larger surface areas,
   forcefully driving conductive elongated contacts together with quantities of a non-rigidified solidifiable material into corresponding apertures,
   wedgingly engaging said contacts into electrically conductive relationship with said plate conductors having said apertures therethrough, the solidifiable material filling voids, and rigidifying said solidifiable material to secure said contacts in said apertures.

2. The method as recited in claim 1 and further including the step of:
   locating said quantities of solidifiable material adjacent said apertures prior to forcefully driving said contacts and said solidifiable material into said apertures.

3. The method as recited in claim 1 and further including the step of:
   locating said quantities of solidifiable material on said contacts prior to forcefully driving said contacts and said solidifiable material into said apertures.

* * * * *